(12) United States Patent
Zuchoski et al.

(10) Patent No.: US 8,662,214 B2
(45) Date of Patent: Mar. 4, 2014

(54) TRACK ASSEMBLY FOR AN ALL-TERRAIN VEHICLE

(71) Applicant: Camoplast Solideal, Inc., Sherbrooke (CA)

(72) Inventors: Jérémie Zuchoski, St-Leonard-D'Aston (CA); Denis Boisvert, St-Gerard-des-Laurentides (CA)

(73) Assignee: Camoplast Solideal Inc., Sherbrooke, Québec (CA)

( * ) Notice: Subject to any disclaimer, the term of this patent is extended or adjusted under 35 U.S.C. 154(b) by 0 days.

(21) Appl. No.: 13/711,663

(22) Filed: Dec. 12, 2012

(65) Prior Publication Data

US 2013/0098696 A1    Apr. 25, 2013

Related U.S. Application Data

(63) Continuation of application No. 12/684,698, filed on Jan. 8, 2010, now Pat. No. 8,347,991, and a continuation of application No. 12/028,177, filed on Feb. 8, 2008, now abandoned.

(51) Int. Cl.
    *B62D 55/00* (2006.01)
(52) U.S. Cl.
    USPC .......................................... 180/9.25; 180/9.1
(58) Field of Classification Search
    USPC ................ 180/9.3, 9.25, 9.28, 184, 190, 193; 305/168, 181, 185, 188, 127
    See application file for complete search history.

(56) References Cited

U.S. PATENT DOCUMENTS

| | | | |
|---|---|---|---|
| 1,368,652 A | 2/1921 | Pennington et al. | |
| 1,539,582 A | 5/1925 | Landry | |
| 3,545,559 A | 12/1970 | Jones | |
| 3,598,454 A | 8/1971 | Richards | |
| 3,664,449 A * | 5/1972 | Vardell | 180/9.48 |
| 3,688,858 A | 9/1972 | Jespersen | |
| 3,771,616 A | 11/1973 | Parodi | |
| 3,776,325 A | 12/1973 | Jespersen | |
| 3,841,424 A | 10/1974 | Purcell et al. | |
| 3,937,288 A | 2/1976 | Kehler | |
| 3,938,606 A | 2/1976 | Yencey | |
| 4,232,753 A | 11/1980 | Carlson | |
| RE32,442 E | 6/1987 | Satzler | |
| 4,681,177 A | 7/1987 | Zborowski | |

(Continued)

FOREIGN PATENT DOCUMENTS

EP           0395489        10/1990
WO    WO 2006/066406        6/2006

OTHER PUBLICATIONS

Camoplast, ATV/UTV Track Systems 2009-2010 Catalog, 8 pages.

(Continued)

*Primary Examiner* — Tashiana Adams
(74) *Attorney, Agent, or Firm* — Finnegan Henderson Farabow Garrett & Dunner LLP

(57) ABSTRACT

The present invention provides track assemblies and a method that allow bringing the contact patch towards the inside (the outside) of the suspension arm, by providing a asymmetric track assembly, either by lowering at least one inside (outside) support wheel relative to the remaining support wheels, or by using a belt that comprises, transversally, at least one first profile on the outer (inner) side thereof lower than a second profile on an inner side thereof.

49 Claims, 6 Drawing Sheets

(56) References Cited

U.S. PATENT DOCUMENTS

| | | | |
|---|---|---|---|
| 4,699,229 A | 10/1987 | Hirose et al. | |
| 4,714,125 A | 12/1987 | Stacy | |
| D298,018 S | 10/1988 | Cartwright | |
| 4,881,609 A | 11/1989 | Purcell et al. | |
| 4,953,919 A | 9/1990 | Langford | |
| 5,273,126 A * | 12/1993 | Reed et al. | 180/9.21 |
| 5,340,205 A | 8/1994 | Nagorcka | |
| 5,533,587 A | 7/1996 | Dow et al. | |
| 5,842,757 A | 12/1998 | Kelderman | |
| D408,326 S * | 4/1999 | Dandurand | D12/7 |
| RE36,284 E | 8/1999 | Kelderman | |
| 6,006,847 A | 12/1999 | Knight | |
| 6,076,619 A | 6/2000 | Hammer | |
| 6,095,275 A | 8/2000 | Shaw | |
| 6,125,956 A | 10/2000 | Gignac | |
| 6,176,334 B1 | 1/2001 | Lorenzen | |
| 6,199,646 B1 | 3/2001 | Tani et al. | |
| RE37,174 E * | 5/2001 | Grawey et al. | 180/9.21 |
| 6,234,590 B1 | 5/2001 | Satzler | |
| 6,401,847 B1 | 6/2002 | Lykken | |
| 6,505,896 B1 * | 1/2003 | Boivin et al. | 305/178 |
| 6,510,913 B1 * | 1/2003 | Morin et al. | 180/182 |
| D476,599 S | 7/2003 | Whittington | |
| 6,609,771 B2 * | 8/2003 | Morin et al. | 305/178 |
| 6,615,939 B1 | 9/2003 | Karales et al. | |
| D488,171 S | 4/2004 | Juncker et al. | |
| 6,810,975 B2 | 11/2004 | Nagorcka et al. | |
| 6,874,586 B2 * | 4/2005 | Boivin et al. | 180/9.26 |
| D505,136 S | 5/2005 | Brazier | |
| 6,904,986 B2 | 6/2005 | Brazier | |
| D528,133 S | 9/2006 | Brazier | |
| 7,131,507 B2 | 11/2006 | Wenger et al. | |
| 7,131,508 B2 | 11/2006 | Brazier | |
| 7,229,141 B2 | 6/2007 | Dandurand et al. | |
| 7,255,184 B2 * | 8/2007 | Loegering et al. | 180/9.26 |
| D556,791 S | 12/2007 | Brazier et al. | |
| 7,347,512 B2 * | 3/2008 | Dandurand | 305/178 |
| 7,497,530 B2 | 3/2009 | Bessette | |
| 7,533,945 B2 | 5/2009 | Jee et al. | |
| 7,597,161 B2 | 10/2009 | Brazier | |
| 7,708,092 B2 | 5/2010 | Després | |
| 7,866,767 B2 | 1/2011 | Lemaire et al. | |
| 2002/0017403 A1 * | 2/2002 | Phely | 180/9.21 |
| 2004/0017107 A1 | 1/2004 | Phely et al. | |
| 2004/0026995 A1 * | 2/2004 | Lemieux | 305/178 |
| 2004/0159475 A1 | 8/2004 | Moor, Jr. | |
| 2006/0113121 A1 | 6/2006 | Radke et al. | |
| 2006/0181148 A1 | 8/2006 | Bessette | |
| 2007/0017714 A1 | 1/2007 | Brazier | |
| 2007/0029871 A1 | 2/2007 | Wake et al. | |
| 2007/0159004 A1 | 7/2007 | St. Amant | |
| 2007/0240917 A1 | 10/2007 | Duceppe | |
| 2009/0194345 A1 | 8/2009 | Bessette | |
| 2009/0218882 A1 | 9/2009 | Rowbottom et al. | |
| 2012/0104840 A1 | 5/2012 | Zuchoski et al. | |

OTHER PUBLICATIONS

Office Action issued on Jan. 17, 2012 in connection with U.S. Appl. No. 12/684,698, 11 pages.
Office Action issued on Nov. 9, 2012 in connection with U.S. Appl. No. 29/405,414, 7 pages.
Office Action issued on Nov. 9, 2012 in connection with U.S. Appl. No. 29/405,416, 7 pages.
Office Action issued on Nov. 9, 2012 in connection with U.S. Appl. No. 29/405,417, 8 pages.
Office Action in U.S. Appl. No. 12/684,698, dated Jan. 17, 2012 (11 pgs.).
Office Action in U.S. Appl. No. 29/404,414, dated Nov. 9, 2012 (7 pgs.).
Office Action in U.S. Appl. No. 29/405,416, dated Nov. 9, 2012 (7 pgs.).
Office Action in U.S. Appl. No. 29/405,417, dated Nov. 9, 2012 (7 pgs.).
Camoplast, ATV/UTV Track Systems 2009-2010 Catalog (8 pgs.).

* cited by examiner

INWARRD

OUTWARD

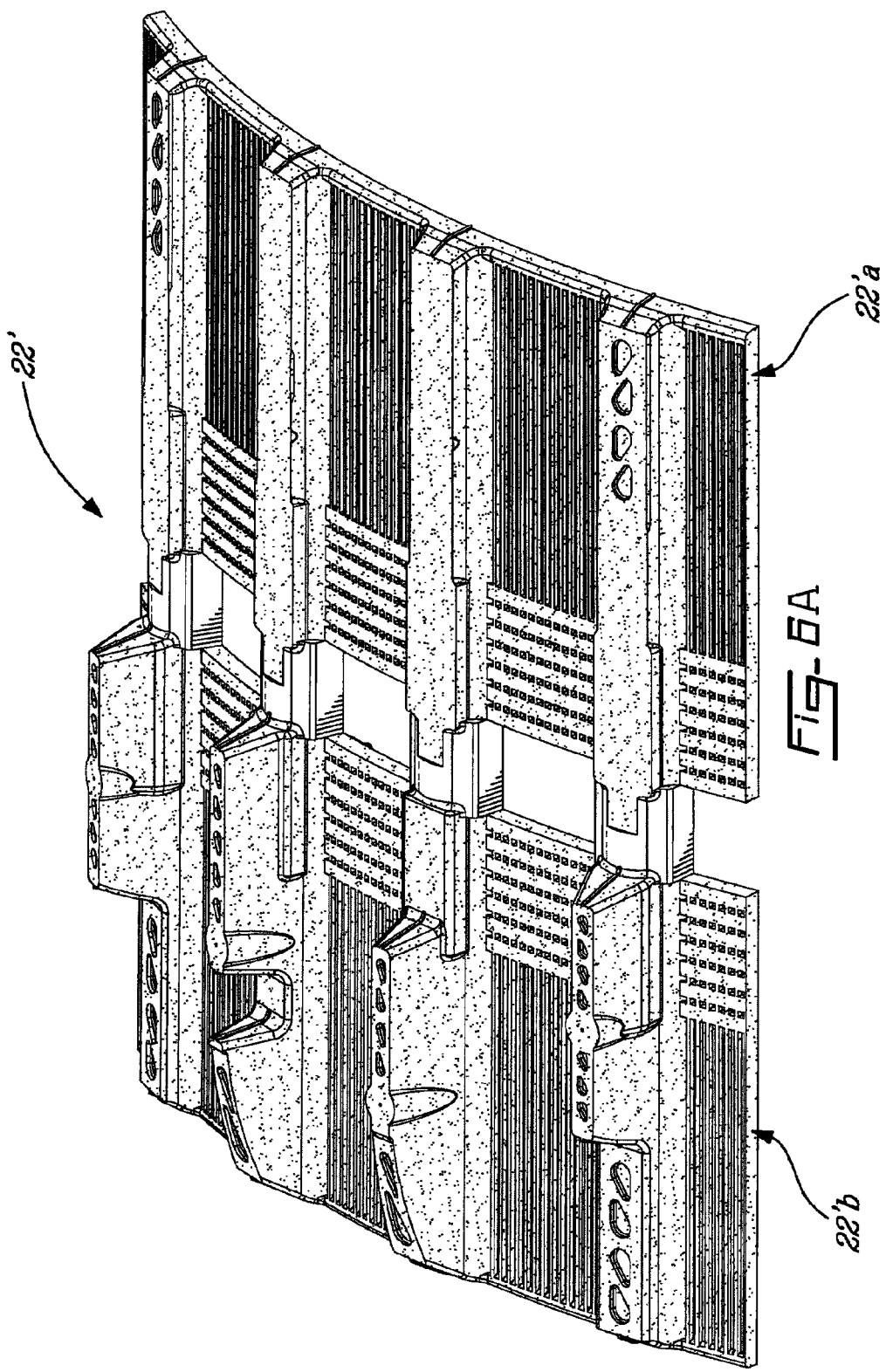

TRACK ASSEMBLY FOR AN ALL-TERRAIN VEHICLE

CROSS REFERENCE TO RELATED APPLICATIONS

This application is a continuation, and claims benefit under 35 U.S.C. 120, of U.S. patent application Ser. No. 12/684,698, filed Jan. 8, 2010, which is a continuation of U.S. patent application Ser. No. 12/028,177 filed Feb. 8, 2008, now abandoned, which claims priority on Canadian application no. 2,606,039, filed on Oct. 3, 2007. All documents identified above are herein incorporated by reference herein.

FIELD OF THE INVENTION

The present invention relates to ATV. More specifically, the present invention is concerned with a track assembly for an all-terrain vehicle.

BACKGROUND OF THE INVENTION

As well known in the art, a track system may be installed on a wheeled ATV (or other wheeled recreational, industrial or agricultural vehicles), to provide an—at least partly—, temporarily, tracked ATV.

The resulting contact area between an endless belt of the tracked vehicle and the underlying ground surface, referred to as patch, is larger than the contact area, or patch, of a corresponding wheel of the vehicle when wheeled on the underlying ground surface, thereby increasing flotation of the vehicle, over smooth terrains such as snow for example.

A drawback is that, generally, this increased contact patch involves an increased area of friction, which needs to be opposed for steering. As a result, it is increasingly harder to rotate the patch around a pivot steering point and steering effort submitted to such a tracked vehicle is higher than to a corresponding wheeled vehicle, i.e. the ATV on its wheels for example.

Using endless belts having a curved transverse geometry allows reducing this problem by allowing an increased contact surface when needed, while maintaining a reduced contact surface on hard surfaces for example.

However, there is still a need in the art for a track assembly for an all-terrain vehicle.

SUMMARY OF THE INVENTION

More specifically, there is provided a vehicle having a main frame and supported on the ground by at least two track assemblies, each track assembly comprising a longitudinal endless belt tensioned around corner wheels and a sprocket wheel, and support wheels provided on a lower run of the longitudinal endless belt, on each side of a suspension arm of the main frame, wherein each track assembly comprises a laterally asymmetric structure comprising at least one of: i) at least one of the support wheels, on one of: i) an inward side and ii) an outward side of the suspension arm, located at a lower position in relation to remaining support wheels; and ii) the belt laterally comprising regions of different profiles.

There is provided a drive system for a vehicle having a main frame supporting an engine and a body of the vehicle and steering device connected to the main frame, a longitudinal endless belt, disposed on the frame of the drive system and connected to the engine to propel the vehicle, being tensioned around corner wheels and a sprocket wheel, support wheels being provided on a lower run of the longitudinal endless belt, on each side of a suspension arm of the main frame, the drive system comprising a first lateral region and a second lateral region, the lateral regions being defined by at least one of: i) the endless belt laterally comprising regions of different profiles; and ii) at least one of the support wheels, on one of: i) an inward side and ii) an outward side of the suspension arm, being located at a lower position in relation to remaining support wheels.

There is further provided a track assembly for a wheeled vehicle, comprising a longitudinal endless belt tensioned around corner wheels and a sprocket wheel, and support wheels provided on a lower run of the longitudinal endless belt, on each side of a suspension arm of the main frame, wherein each track assembly comprises a laterally asymmetric structure comprising at least one of: i) at least one of the support wheels, on one of: i) an inward side and ii) an outward side of the suspension arm, located at a lower position in relation to remaining support wheels; and ii) the belt laterally comprising regions of different profiles.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Figure 1:
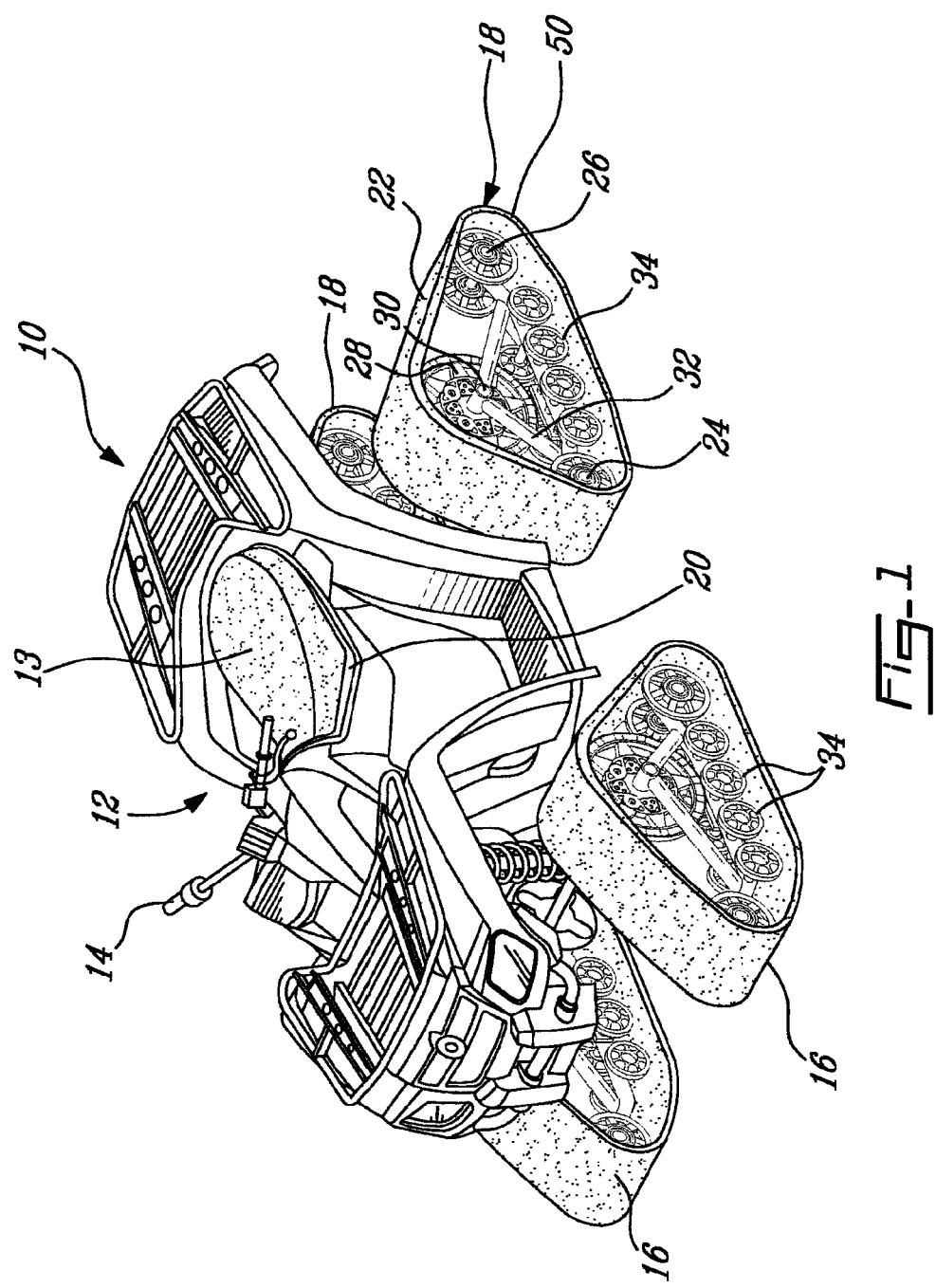
FIG. 1 is a front left-elevation view a vehicle according to an embodiment of an aspect of the present invention.

As illustrated in FIG. 1, a vehicle 10 according to an embodiment of an aspect of the present invention generally comprises a body 12 with a seat 13 for accommodating a rider (nor shown) who uses handlebars 14, for example, to steer the vehicle. The body 12 is supported by track assemblies 16 in the front and track assemblies 18 in the back, in place of front and rear wheels respectively in the case of a wheeled vehicle, symmetrically about a vertical axis 20.

The track assemblies may be operatively connected to the engine (not shown) to propel the vehicle 10.

As best seen in FIG. 1, a track assembly typically comprises a longitudinal endless belt 22 tensioned around corner wheels 24, 26 and a sprocket wheel 28. The track assembly is removably connected to a hub 30 by a frame 32; the hub 30 corresponding to the one previously connecting a wheel of the wheeled vehicle and providing rotational motion to that wheel for example.

Figure 3:
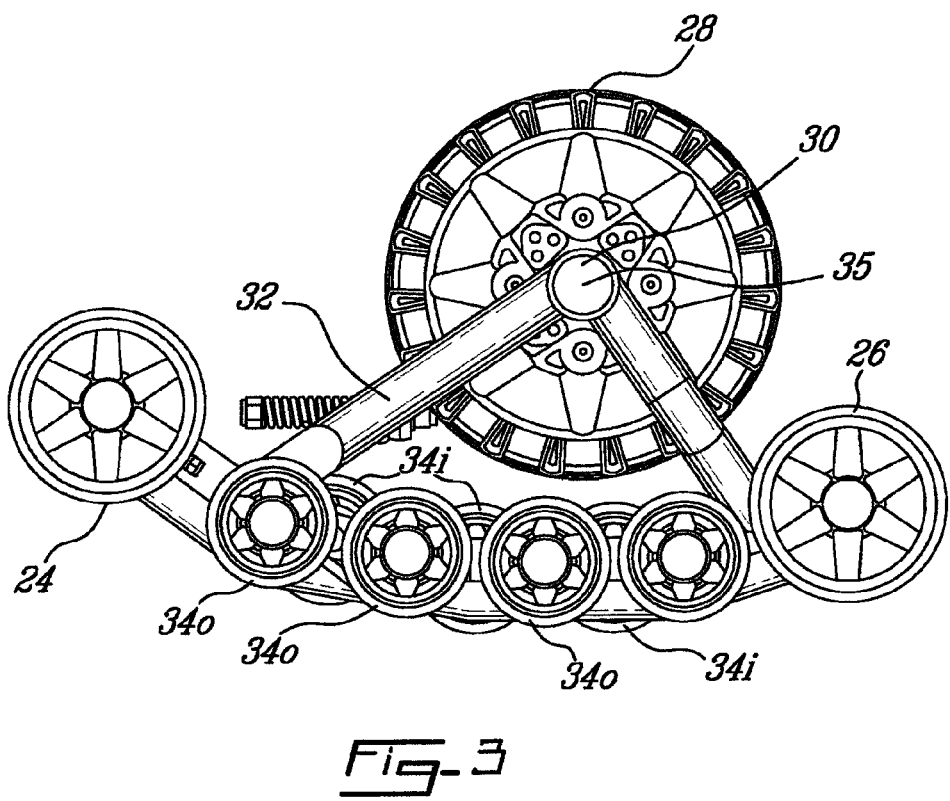
FIG. 3 is a side view of a track assembly according to an embodiment of an aspect of the present invention.

In FIG. 3, the hub 30 transfers its rotational motion to the sprocket wheel 28 that turns the track assembly around the same hub axis 30 and sprocket axis 35 by contact with the endless belt 22. The sprocket 28 and frame 32 are independently rotatable about hub 30.

Figure 2:
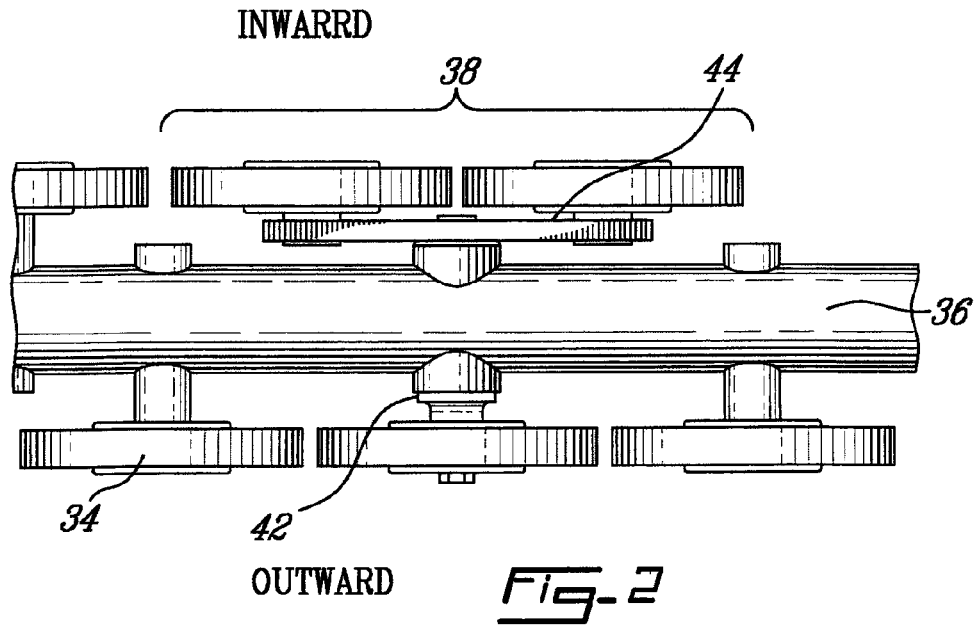
FIG. 2 is a partial top view of a track assembly according to an embodiment of an aspect of the present invention.
Figure 4:
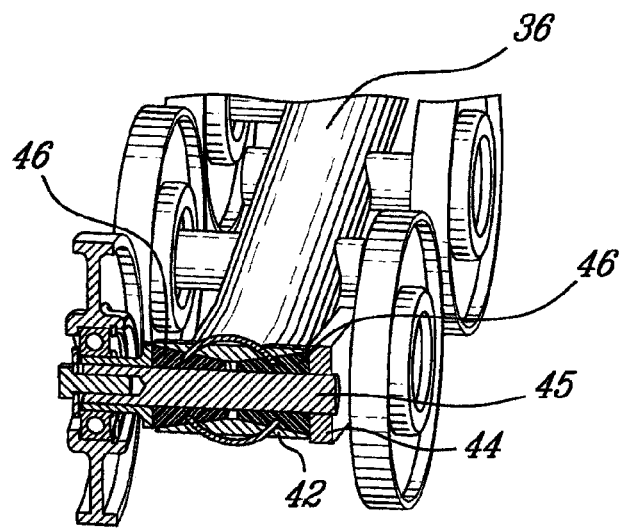
FIG. 4 is a cross section of the track assembly of FIG. 2.

Support wheels 34 are provided, on a lower run of the endless belt 22, on each side of a suspension arm 36 of the main frame 32 best seen in FIGS. 2 and 4 for example.

The endless belt 22 of each track assembly is typically an endless reinforced rubber belt, having a ground engaging surface and an inner surface. The ground-engaging surface may be provided with traction lugs that engage the underlying ground surface, whereas the inner surface is provided with driving lugs that engage the wheels.

Figure 7:
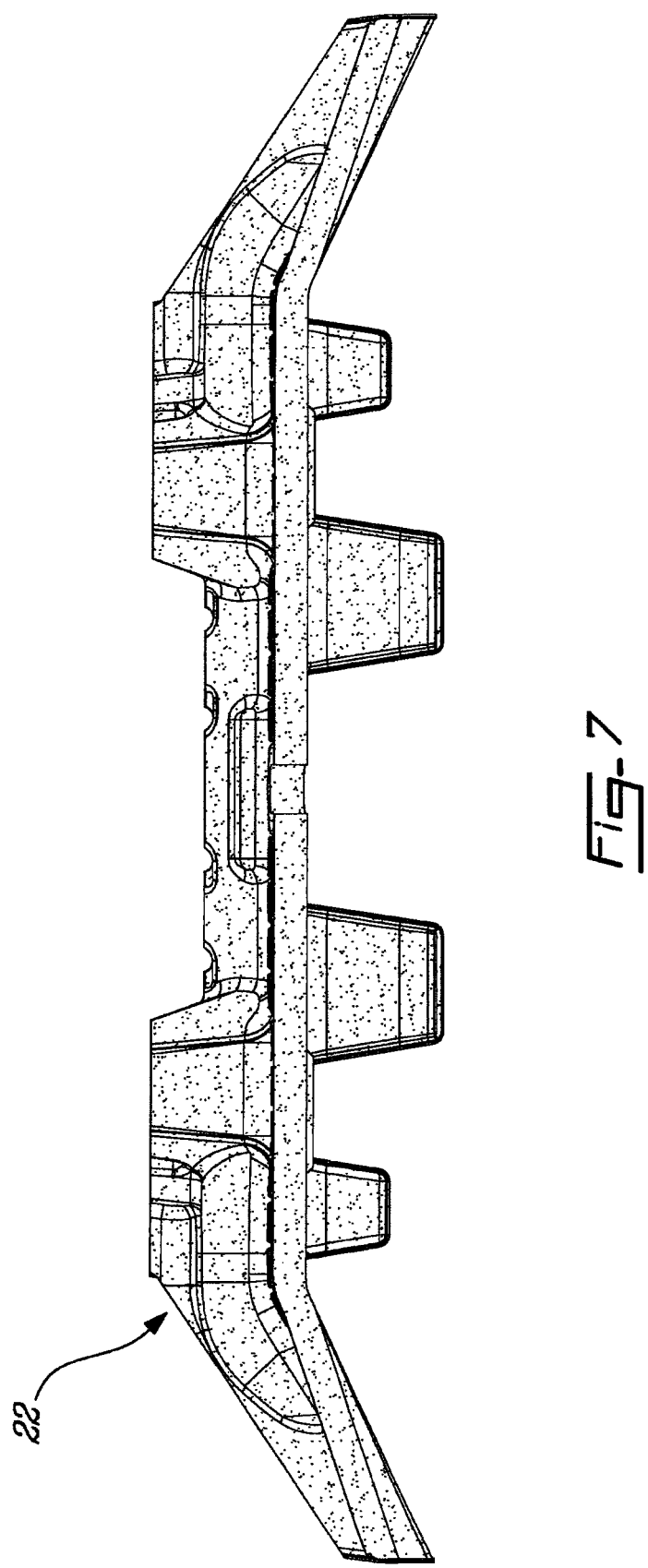
FIG. 7 is a cross section of a belt having a generally convex transverse profile.

The endless belt 22 may have a generally convex transverse profile, from the outward peripheral edge to the inner peripheral edge thereof, to provide a limited contact surface with the underground when the underground is hard, as known in the art (see FIG. 7).

When replacing a tire of a vehicle by a track assembly without modification of the geometry of the vehicle, the contact area, now between the endless belt and the underground surface, is generally shifted outward relative to the contact patch previously between the tire and the underground surface. It is found that by lowering an inner support wheel, the contact patch may be repositioned.

In a first embodiment of the present invention, as illustrated in FIGS. 2 to 4, the contact patch of the track system is shifted laterally in relation to the suspension arm 36, either inwards or outwards, by providing that at least one support wheel 34 be lower that the remaining ones, on the inward side or the outward side of the suspension arm 36 respectively.

Thus, as illustrated in FIG. 3, inside support wheels 34i may be lowered slightly relative to outside support wheels 34o, so as to shift the contact patch laterally inwards, i.e. away from the outward peripheral edge 50 of the width of the belt 22 (see FIG. 1).

Providing at least one support wheel lower than the remaining support wheels, on the inside of the main suspension arm, allows the contact patch provided by this at least one lower support wheel to be positioned at the location it used to be when the vehicle, conceived for tires, was on tires.

As known in the art, support wheels 34 may further be arranged in tandem in order to alleviate the load on the contacts points created, as tandem 38 shown in FIG. 2, which frame 44 is mounted by pivot 42 to the suspension arm 36 of the main frame 32.

The frame 44 of the tandem 38 of these inside support wheels 34i, which are thus in the contact patch, being mounted on the pivot 42 (FIG. 2), is able to adapt and conform to the underground terrain.

In such an arrangement, by providing that at least one lower support wheel is mounted on a secondary frame 44 pivotally connected to the main suspension arm so that the motion of the secondary frame is relatively independent from the rest of the track assembly, the generated contact patch moves as requested by the movement of the vehicle, for instance when the track pivots around a vertical axis for the vehicle being able to turn.

As shown in FIG. 4, the axle 45 of the tandem 38 with lowered support wheels may be provided with rubber bushings 46, for a soft suspension 44 independent from the main suspension 32, by providing a further cushioning versus shocks, and further improved adaptation to the underground terrain.

Figure 5:
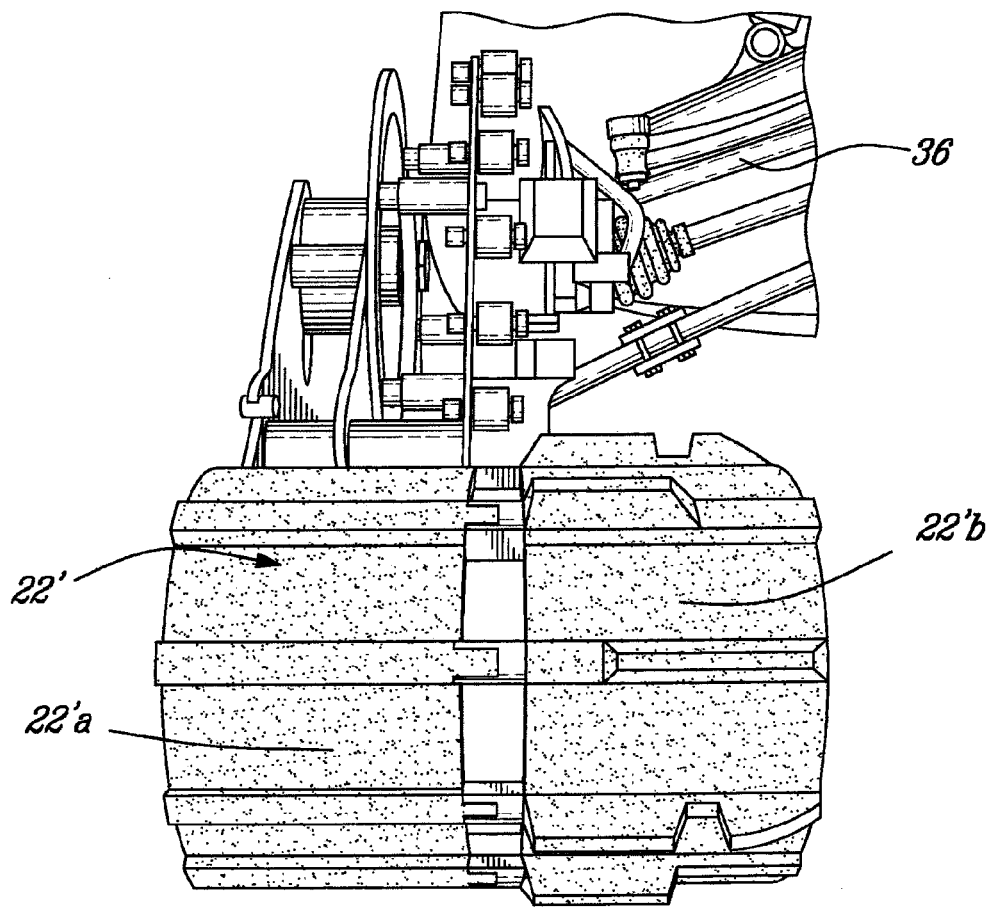
FIG. 5 illustrates a belt of a track assembly according to a further embodiment of the present invention.
Figure 6B:
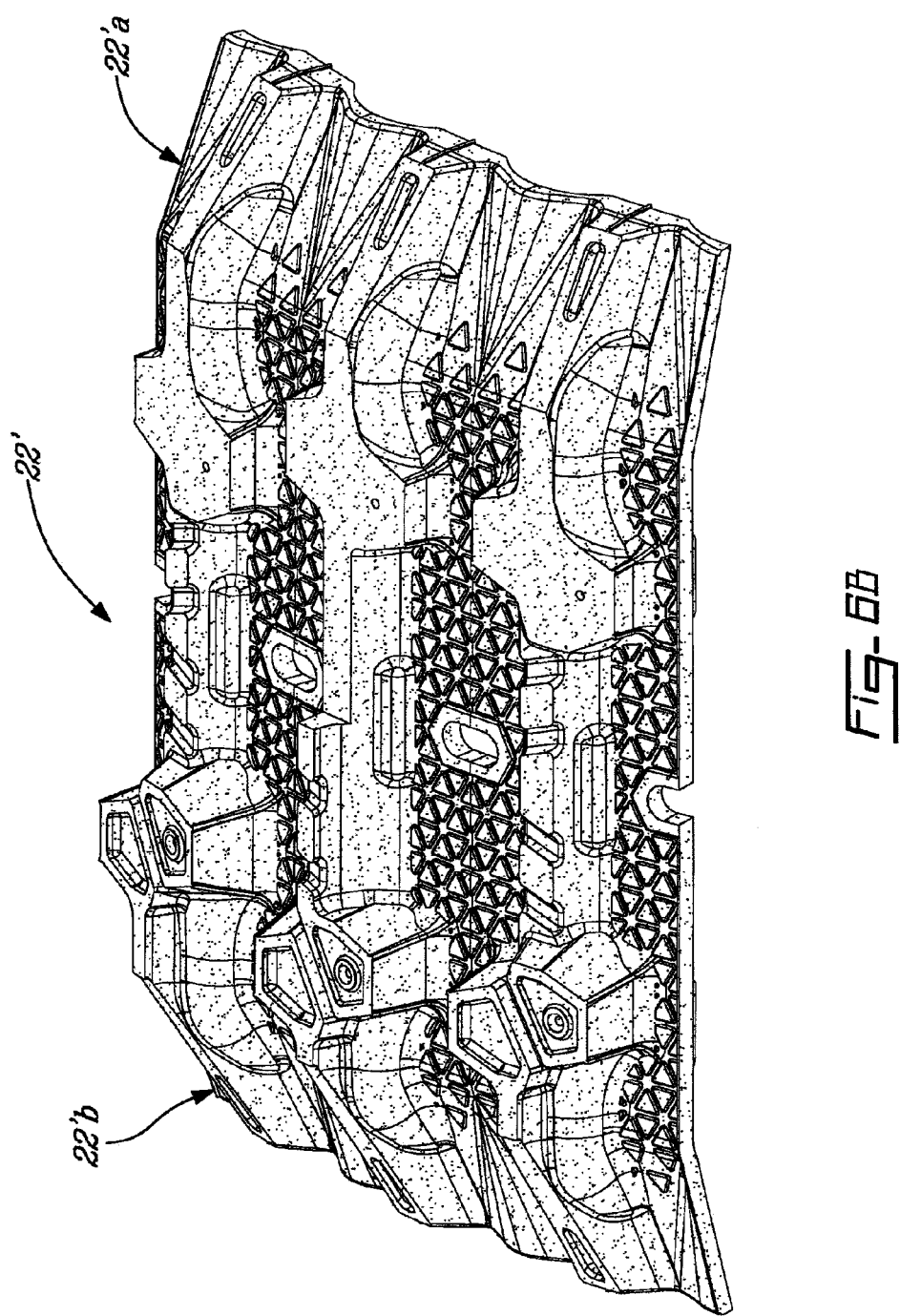
FIG. 6 are upper partial perspective views of: a) an asymmetric belt and b) an asymmetric belt having a generally convex transverse profile, for a track assembly according to a further embodiment of the present invention.

In a second embodiment illustrated for example in FIGS. 5 and 6, the contact patch of the track system is shifted laterally in relation to the suspension arm 36 by providing that the belt 22' comprises, transversally, at least one first profile 22'a on the outer side thereof, and a second profile 22'b on an inner side thereof. By providing that the second profile 22'b on an inner side is higher that the first profile 22'a, the contact patch is thus brought towards the inside of the suspension arm 36.

Therefore, the contact patch of a track system may be shifted laterally in relation to the suspension arm 36, inwards (or outwards), by providing a asymmetric track assembly, either by lowering at least one inside (outside) support wheel relative to the remaining support wheels, or by using a belt that comprises, transversally, at least one first profile on the outer side thereof lower (higher) than a second profile on an inner side thereof.

As people in the art will appreciate, an asymmetric track according to the present invention may combine at least one inside support wheel lowered relative to the remaining support wheels and a varying-profile belt, as described hereinabove.

Therefore, the present invention provides track assemblies and a method that allow bringing the contact patch towards the inside of the suspension arm 36, thereby repositioning the normal tire contact patch, i.e. the contact patch of the vehicle when on wheels. As a result, the steering effort of the track system is reduced to a minimum in a range of conditions, including snow, dirt, asphalt, rocks, etc, for example.

Therefore, according to an aspect of the present invention, there is provided a vehicle comprising at least two asymmetric track assemblies replacing wheels of a wheeled vehicle.

A suspension as described herein may be applied to a range of wheeled vehicles, such as for example recreational vehicles, ATV, light industrial vehicles, industrial vehicles, agricultural vehicles and military vehicles.

The present invention allows reducing the steering effort in such vehicles, which geometry of the suspension is specifically designed for wheels, to a minimum in all conditions, snow, dirt, asphalt, rocks, etc.

Although the present invention has been described hereinabove by way of embodiments thereof, it may be modified, without departing from the nature and teachings of the subject invention as defined in the appended claims.

What is claimed is:

1. A track assembly for providing traction to a vehicle on a ground surface, the track assembly comprising:
   a) an endless track comprising:
      a ground-engaging outer surface for engaging the ground surface;
      an inner surface opposite to the ground-engaging outer surface; and
      a first lateral edge and a second lateral edge defining a width of the endless track; and
   b) a track-engaging system for driving and guiding the endless track, the track-engaging system comprising:
      a drive wheel for driving the endless track; and
      a front corner wheel and a rear corner wheel spaced apart in a longitudinal direction of the track assembly;
   the endless track being disposed around the track-engaging system, a lower run of the endless track defining a contact patch of the endless track with the ground surface;
   the track assembly having an asymmetric configuration such that the contact patch of the endless track is distributed more towards the first lateral edge of the endless track than towards the second lateral edge of the endless track.

2. The track assembly claimed in claim 1, wherein: the endless track has a first half extending from a centerline of the endless track to the first lateral edge of the endless track and a second half extending from the centerline of the endless track to the second lateral edge of the endless track; and the track-engaging system is configured to apply more pressure on the first half of the endless track than on the second half of the endless track.

3. The track assembly claimed in claim 2, wherein: the track-engaging system comprises a plurality of support wheels disposed between the front corner wheel and the rear corner wheel in the longitudinal direction of the track assembly; and a given one of the support wheels is disposed between the centerline of the endless track and the first lateral edge of the endless track and extends lower than any support wheel disposed between the centerline of the endless track and the second lateral edge of the endless track.

4. The track assembly claimed in claim 3, wherein: the given one of the support wheels is a first given one of the support wheels; and a second given one of the support wheels is disposed between the centerline of the endless track and the first lateral edge of the endless track and extends lower than any support wheel disposed between the centerline of the endless track and the second lateral edge of the endless track.

5. The track assembly claimed in claim 2, wherein a lowest point of the track-engaging system is closer to the first lateral edge of the endless track than to the second lateral edge of the endless track.

6. The track assembly claimed in claim 1, wherein: the track-erigagimg system comprises a plurality of support wheels disposed between the front corner wheel and the rear corner wheel in the longitudinal direction of the track assembly; and a first one of the support wheels is spaced apart from a second one of the support wheels in a widthwise direction of the track assembly, is closest to the second one of the support wheels in the longitudinal direction of the track assembly, is closer to the first lateral edge of the endless track than the second one of the support wheels, and extends lower than the second one of the support wheels.

7. The track assembly claimed in claim 1, wherein a lowest point of the track-engaging system is closer to the first lateral edge of the endless track than to the second lateral edge of the endless track.

8. The track assembly claimed in claim 1, wherein: the track-engaging system comprises a plurality of support wheels disposed between the front corner wheel and the rear corner wheel in the longitudinal direction of the track assembly; the track assembly comprises a wheel-supporting arrangement supporting the front corner wheel, the rear corner wheel, and the support wheels; and a given one of the support wheels is disposed between the wheel-supporting arrangement and the first lateral edge of the endless track and extends lower than any support wheel disposed between the wheel-supporting arrangement and the second lateral edge of the endless track.

9. The track assembly claimed in claim 8, wherein the given one of the support wheels is mounted to the wheel-supporting arrangement at a lower position than any support wheel disposed between the wheel-supporting, arrangement and the second lateral edge of the endless track.

10. The track assembly claimed in claim 8, wherein: the given one of the support wheels is a first given one of the support wheels; and a second given one of the support wheels is disposed between the wheel-supporting arrangement and the first lateral edge of the endless track and extends lower than any support wheel disposed between the wheel-supporting arrangement and the second lateral edge of the endless track.

11. The track assembly claimed in claim 10, wherein the wheel-supporting arrangement comprises: a first wheel-supporting structure interconnecting the front corner wheel and the rear corner wheel; and a second wheel-supporting structure carrying the first given one of the support wheels and the second given one of the support wheels and pivotable relative to the first wheel-supporting structure.

12. The track assembly claimed in claim 11, wherein the wheel-supporting arrangement comprises a resilient bushing disposed between the first wheel-supporting structure and the second wheel-supporting structure to cushion against shocks.

13. The track assembly claimed in claim 1, wherein: the endless track has a first half extending from a centerline of the endless track to the first lateral edge of the endless track and a second half extending from the centerline of the endless track to the second lateral edge of the endless track; and the first half of the endless track is configured to apply more pressure on the ground surface than the second half of the endless track.

14. The track assembly claimed in claim 1, wherein: the endless track has a first half extending from a centerline of the endless track to the first lateral edge of the endless track and a second half extending from the centerline of the endless track to the second lateral edge of the endless track; and the first half of the endless track has a greater volume than the second half of the endless track.

15. The track assembly claimed in claim 1, wherein: the endless track has a first half extending from a centerline of the endless track to the first lateral edge of the endless track and a second half extending from the centerline of the endless track to the second lateral edge of the endless track; and the first half of the endless track has a greater average thickness than the second half of the endless track.

16. The track assembly claimed in claim 1, wherein a greatest thickness of the endless track is located closer to the first lateral edge of the endless track than to the second lateral edge of the endless track.

17. The track assembly claimed in claim 1, wherein: the endless track comprises a plurality of traction projections projecting from the ground-engaging outer surface; the traction projections vary in height in a widthwise direction of the endless track; and the traction projections are higher closer to the first lateral edge of the endless track than to the second lateral edge of the endless track.

18. The track assembly claimed in claim 1, wherein: the endless track has a first half extending from a centerline of the endless track to the first lateral edge of the endless track and a second half extending from the centerline of the endless track to the second lateral edge of the endless track; the endless track comprises a plurality of traction projections projecting from the ground-engaging outer surface; the traction projections vary in height in a widthwise direction of the endless track; and an average height of the traction projections in the first half of the endless track is greater than an average height of the traction projections in the second half of the endless track.

19. The track assembly claimed in claim 1, wherein: the endless track comprises a plurality of traction projections projecting from the ground-engaging outer surface; the traction projections vary in height in a widthwise direction of the endless track; and a greatest height of the traction projections is located closer to the first lateral edge of the endless track than to the second lateral edge of the endless track.

20. The track assembly claimed in claim 1, wherein: the endless track has a first half extending from a centerline of the endless track to the first lateral edge of the endless track and a second half extending from the centerline of the endless track to the second lateral edge of the endless track; the endless track comprises a plurality of traction projections projecting from the ground-engaging outer surface; and the traction projections occupy more volume in the first half of the endless track than in the second half of the endless track.

21. The track assembly claimed in claim 1, wherein the endless has a generally convex shape in a widthwise direction of the endless track.

22. The track assembly claimed in claim 1, wherein the endless track comprises a first lateral edge portion and a second lateral edge portion that are respectively adjacent to the first lateral edge and the second lateral edge of the endless track and that bend away from the ground surface.

23. The track assembly claimed in claim 1, wherein the first lateral edge of the endless track is located closer to a center of the vehicle than the second lateral edge of the endless track when the track assembly is mounted to the vehicle.

24. The track assembly claimed in claim 1, wherein the track assembly is configured such that a highest pressure exerted by the contact patch of the endless track is closer to the first lateral edge of the endless track than to the second lateral edge of the endless track.

25. The track assembly claimed in claim 1, wherein: the track assembly is mountable to the vehicle in place of a ground-engaging wheel comprising a tire; and the track assembly is configured such that a highest pressure exerted by the contact patch of the endless track is located where a contact patch of the tire would be located.

26. The track assembly claimed in claim 1, wherein the lower run of the endless track includes a front segment under the front corner wheel, a rear segment under the rear corner wheel, and an intermediate segment under the support wheels and extending lower than the front segment of the lower run of the endless track.

27. The track assembly claimed in claim 1, wherein the track assembly is steerable by a steering device of the vehicle to turn the vehicle.

28. The track assembly claimed in claim 1, wherein the track assembly is pivotable relative to a body of the vehicle about an axis of rotation of the drive wheel.

29. The track assembly claimed in claim 1, wherein the vehicle is an ATV.

30. The track assembly claimed in claim 29, wherein the ATV comprises handlebars for steering the ATV.

31. A set of four track assemblies for providing traction to a vehicle on a ground surface, the set of four track assemblies comprising a track assembly as claimed in claim 1, wherein each of at least two track assemblies of the set of four track assemblies is steerable by a steering device of the vehicle to turn the vehicle.

32. An endless track for a track assembly providing traction to a vehicle on a ground surface, the track assembly comprising a track-engaging system for driving and guiding the endless track, the track-engaging system comprising: a drive wheel for driving the endless track; and a front corner wheel and a rear corner wheel spaced apart in a longitudinal direction of the track assembly, the endless track being mountable around the track-engaging system, the endless track comprising:
  a) a ground-engaging outer surface for engaging the ground surface;
  b) an inner surface opposite to the ground-engaging outer surface; and
  c) a first lateral edge and a second lateral edge defining a width of the endless track;
  a lower run of the endless track defining a contact patch of the endless track with the ground surface, the endless track having a first half extending from a centerline of the endless track to the first lateral edge of the endless track and a second half extending from the centerline of the endless track to the second lateral edge of the endless track, the endless track being asymmetric relative to the centerline of the endless track such that the contact patch of the endless track is distributed more towards the first lateral edge of the endless track than towards the second lateral edge of the endless track.

33. The endless track claimed in claim 32, wherein the first half of the endless track is configured to apply more pressure on the ground surface than the second half of the endless track.

34. The endless track claimed in claim 32, wherein the first half of the endless track has a greater volume than the second half of the endless track.

35. The endless track claimed in claim 32, wherein the first half of the endless track has a greater average thickness than the second half of the endless track.

36. The endless track claimed in claim 32, wherein a greatest thickness of the endless track is located closer to the first lateral edge of the endless track than to the second lateral edge of the endless track.

37. The endless track claimed in claim 32, comprising a plurality of traction projections projecting from the ground-engaging outer surface, the traction projections varying in height in a widthwise direction of the endless track, the traction projections being higher closer to the first lateral edge of the endless track than to the second lateral edge of the endless track.

38. The endless track claimed in claim 32, comprising a plurality of traction projections projecting from the ground-engaging outer surface, the traction projections varying in height in a widthwise direction of the endless track, an average height of the traction projections in the first half of the endless track being greater than an average height of the traction projections in the second half of the endless track.

39. The endless track claimed in claim 32, comprising a plurality of traction projections projecting from the ground-engaging outer surface, the traction projections varying in height in a widthwise direction of the endless track, a greatest height of the traction projections being located closer to the first lateral edge of the endless track than to the second lateral edge of the endless track.

40. The endless track claimed in claim 32, comprising a plurality of traction projections projecting from the ground-engaging outer surface, the traction projections occupying more volume in the first half of the endless track than in the second half of the endless track.

41. The endless track claimed in claim 32, wherein the endless has a generally convex shape in a widthwise direction of the endless track.

42. The endless track claimed in claim 32, comprising a first lateral edge portion and a second lateral edge portion that are respectively adjacent to the first lateral edge and the second lateral edge of the endless track and that bend away from the ground surface.

43. The endless track claimed in claim 32, wherein the first lateral edge of the endless track is located closer to a center of the vehicle than the second lateral edge of the endless track when the track assembly is mounted to the vehicle.

44. The endless track claimed in claim 32, wherein the endless track is configured such that a highest pressure exerted by the contact patch of the endless track is closer to the first lateral edge of the endless track than to the second lateral edge of the endless track.

45. The endless track claimed in claim 32, wherein: the track assembly is mountable to the vehicle in place of a ground-engaging wheel comprising a tire; and the endless track is configured such that a highest pressure exerted by the contact patch of the endless track is located where a contact patch of the tire would be located.

46. The endless track claimed in claim 32, comprising a plurality of driving projections projecting from the inner surface to engage the drive wheel.

47. The endless track claimed in claim 32, wherein the track assembly is steerable by a steering device of the vehicle to turn the vehicle.

48. A track assembly for providing traction to a vehicle on a ground surface, the track assembly comprising:
   a) an endless track comprising:
      a ground-engaging outer surface for engaging the ground surface;
      an inner surface opposite to the ground-engaging outer surface; and
      a first lateral edge and a second lateral edge defining a width of the endless track; and
   b) a track-engaging system for driving and guiding the endless track, the track-engaging system comprising:
      a drive wheel for driving the endless track; and
      a front corner wheel and a rear corner wheel spaced apart in a longitudinal direction of the track assembly;
   the endless track being disposed around the track-engaging system, a lower run of the endless track defining a contact patch of the endless track with the ground surface;
   the track assembly being configured such that, when an axis of rotation of the drive wheel is horizontal, the contact patch of the endless track is distributed more towards the first lateral edge of the endless track than towards the second lateral edge of the endless track.

49. A track assembly for providing traction to a vehicle on a ground surface, the track assembly comprising:
   a) an endless track comprising:
      a ground-engaging outer surface for engaging the ground surface;
      an inner surface opposite to the ground-engaging outer surface; and
      a first lateral edge and a second lateral edge defining a width of the endless track; and
   b) a track-engaging system for driving and guiding the endless track, the track-engaging system comprising:
      a drive wheel for driving the endless track; and
      a front corner wheel and a rear corner wheel spaced apart in a longitudinal direction of the track assembly;
   the endless track being disposed around the track-engaging system, a lower run of the endless track defining a contact patch of the endless track with the ground surface;
   the track assembly being configured such that a highest pressure exerted by the contact patch of the endless track is closer to the first lateral edge of the endless track than to the second lateral edge of the endless track.

* * * * *